US00RE34746E

United States Patent [19]

Schutten et al.

[11] E Patent Number: Re. 34,746

[45] Reissued Date of Patent: Oct. 4, 1994

[54] OPEN-CENTER STEERING CONTROL UNIT WITH FLOW AMPLIFICATION

[75] Inventors: Herman P. Schutten, Bayside, Wis.; Dwight B. Stephenson, Savage; Donald M. Haarstad, Chaska, both of Minn.

[73] Assignee: Eaton Corporation, Cleveland, Ohio

[21] Appl. No.: 822,245

[22] Filed: Jan. 17, 1992

Related U.S. Patent Documents

Reissue of:

[64] Patent No.: 4,958,493
Issued: Sep. 25, 1990
Appl. No.: 325,721
Filed: Mar. 20, 1989

U.S. Applications:

[63] Continuation-in-part of Ser. No. 254,067, Oct. 6, 1988, Pat. No. 4,862,690.

[51] Int. Cl.[5] ..... F16D 31/02

[52] U.S. Cl. ..... 60/384; 91/375 R; 137/596.13; 137/625.24

[58] Field of Search ..... 60/384; 91/370, 375 R, 91/467; 137/596.13, 625.21, 625.24; 180/132

[56] References Cited

U.S. PATENT DOCUMENTS

| | | | |
|---|---|---|---|
| 3,564,848 | 2/1971 | Baatrup et al. | 60/52 |
| 3,584,537 | 6/1971 | Schulz | 91/411 |
| 4,037,620 | 7/1977 | Johnson | 91/446 |
| 4,096,883 | 6/1978 | Yip | 137/625.24 X |
| 4,109,679 | 8/1978 | Johnson | 91/467 X |
| 4,167,893 | 9/1979 | Johnson | 91/446 |
| 4,212,229 | 7/1980 | Johnson | 91/446 |
| 4,221,159 | 9/1980 | Liebert | 91/467 |
| 4,471,808 | 9/1984 | Thomsen et al. | 91/467 X |
| 4,561,516 | 12/1985 | Bishop et al. | 137/625.32 X |
| 4,566,272 | 1/1986 | Petersen et al. | 60/384 |
| 4,730,544 | 3/1988 | Jorgensen | 91/467 |
| 4,759,182 | 7/1988 | Haarstad | 137/625.21 X |
| 4,781,219 | 11/1988 | Haarstad et al. | 137/596.13 X |
| 4,799,514 | 1/1989 | Tanaka et al. | 137/625.24 X |
| 4,827,978 | 5/1989 | Novacek | 60/384 X |
| 4,838,314 | 6/1989 | Gage | 91/467 X |
| 4,862,690 | 9/1989 | Haarstad | 60/384 |
| 4,875,542 | 10/1989 | Uchida et al. | 91/375 R X |
| 4,955,444 | 9/1990 | Petersen et al. | 180/132 |

*Primary Examiner*—Edward K. Look
*Assistant Examiner*—John Ryznic
*Attorney, Agent, or Firm*—L. J. Kasper

[57] ABSTRACT

An open-center fluid controller (15) is disclosed for controlling the flow of fluid to a steering cylinder (25). The controller includes a fluid meter (29) and valving arrangement (27), including a valve spool (43) and a sleeve (45), which define a main fluid path. The main path includes a fixed flow control orifice (86), a variable flow control orifice (87), the fluid meter (29), and a variable flow control orifice (89). In accordance with the invention, the spool and sleeve define an amplification fluid path (101), including a variable amplification orifice (99), in parallel with the main fluid path, and disposed to amplify the flow of fluid through the meter (29). In order to facilitate manual steering, the amplification orifice (99) reaches its maximum flow area when the spool and sleeve are in a normal operating position (FIG. 6). The amplification orifice then decreases and closes as the displacement between the spool and sleeve reach a maximum displacement (FIG. 7). As a result, the amplification fluid path (101) is closed at maximum valve displacement, thus making it possible to manually steer the vehicle.

18 Claims, 5 Drawing Sheets

OPEN-CENTER STEERING CONTROL UNIT WITH FLOW AMPLIFICATION

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of U.S. Ser. No. 254,067, filed Oct. 6, 1988, now U.S. Pat. No. 4,862,690 in the name of Donald M. Haarstad for a "STEERING CONTROL UNIT WITH BOTH FLOW AMPLIFICATION AND MANUAL STEERING CAPABILITY".

BACKGROUND OF THE DISCLOSURE

The present invention relates to open-center fluid controllers of the type used to control the flow of fluid from a source of fluid to a fluid pressure operated device, such as a steering cylinder.

A typical fluid controller of the type to which the present invention relates includes a housing which defines various fluid ports, and further includes a fluid meter and valving, and an arrangement for imparting follow-up movement to the valving in response to flow through the fluid meter. In an open-center controller, the flow through the controller is not directly proportional to a main variable flow control orifice, and to the deflection (displacement) of the valving. Instead, the deflection of the valving in an open-center controller depends upon the load, as represented by the pressure drop across the controller.

It has long been an object of those skilled in the art to provide a steering system, including a fluid controller, in which the total flow through the steering system is substantially greater than the flow through the controller, but with the overall system flow being related to the flow through the controller, in a known manner. See, for example, U.S. Pat. No. 4,052,929 in which the controller receives fluid from one pump then generates a pilot signal to control a pilot operated valve which receives fluid from a second pump. The total steering flow comprises the flow through the pilot operated valve, plus the flow from the controller. Such a system is theoretically satisfactory, but the cost of such a system becomes nearly prohibitive because of the addition of the pilot operated valve and the second pump.

U.S. Pat. No. 4,759,182, assigned to the assignee of the present invention, and incorporated herein by reference, discloses a load-sensing (closed-center) fluid controller in which the valving defines an amplification fluid path, including a variable amplification orifice in parallel with the main fluid path. In the preferred embodiment of the device of the above-incorporated patent, the amplification fluid path is in fluid communication with the main fluid path at a first location disposed between the fluid inlet port and a first variable flow control orifice, typically referred to as the main variable flow control orifice, or simply the A1 orifice. As is well known to those skilled in the art, in load-sensing controllers, the pressure drop across the A1 orifice is maintained substantially constant, and therefore, the flow through the A1 orifice, and the controller, is directly proportional to the size of the A1 orifice.

In open-center controllers of the type to which the present invention relates, however, there is no main variable flow control orifice. Instead, in an open-center controller, there is a constant flow of fluid through the controller valving to the reservoir when the controller is in neutral, and the pressure of this fluid flow is inherently just slightly above the pressure in the reservoir. As the valving is displaced from neutral, the neutral flow control orifice to the reservoir begins to close and build pressure, and the operator continues to displace the steering wheel and the valving until the fluid pressure builds to a level sufficient to overcome the load on the steering cylinder.

On many of the vehicles which utilize open-center controllers, it is also desirable for the controller to provide a manual steering capability, i.e., the ability to generate pressurized fluid by rotation of the steering wheel, valving, and fluid meter when the pump is inoperative, or for some other reason is unable to generate fluid pressure. It has been discovered that when the amplification fluid path of U.S. Pat. No. 4,759,182 is applied to fluid controllers, any attempts to manually steer the vehicle tend to be unsuccessful.

SUMMARY OF THE INVENTION

Accordingly, it is an object of the present invention to provide an improved steering system and open-center controller, wherein the controller has the capability of providing a steering flow which is substantially larger than the flow through the fluid meter of the controller, without the need for additional valves or other components.

It is another object of the present invention to provide an improved open-center controller which accomplishes the above-identified object, without inhibiting the capability of the controller to operate in a manual steering mode.

The above and other objects of the present invention are accomplished by the provision of an improved open-center controller operable to control the flow of fluid from a source of fluid to a fluid pressure operated device. The controller is of the type including housing means defining a fluid inlet port for connection to the source of fluid, a return port for connection to a reservoir, and first and second control fluid ports for connection to the fluid pressure operated device. Valve means is disposed in the housing means and defines a neutral position and a first operating position, the housing means and valve means cooperating to define a neutral fluid path communicating between the inlet port and the return port, including a variable neutral orifice having its maximum flow area when the valve means is in the neutral position and a decreasing flow area as the valve means is displaced from the neutral position toward the first operating position. The housing means and the valve means cooperate to define a main fluid path communicating between the inlet port and the first control fluid port, and between the second control fluid port and the return port when the valve means is in the first operating position. Fluid actuated means is included for imparting follow-up movement to the valve means proportional to the volume of fluid flow through the fluid actuated means, the fluid actuated means being disposed in series flow relationship in the main fluid path between the inlet port and the first control fluid port. The main fluid path includes a first, fixed flow control orifice disposed between the inlet port and the fluid actuated means; a second, variable flow control orifice disposed between the first flow control orifice and the fluid actuated means; and a third, variable flow control orifice disposed between the fluid actuated means and the first control fluid port. The second and third flow control orifices have minimum flow areas when the valve means is in the neutral position, and increasing flow areas as the valve means is displaced from the neutral position toward the first operating position. The improved open-center controller is characterized by the housing means and the valve means cooperating to define an amplification fluid path in parallel with the main fluid path, the amplification fluid path being in fluid communication with the main fluid path at a first location disposed between the fluid inlet port and the first, fixed flow control orifice, and at a second location disposed between the third, variable flow control orifice and the first control fluid port. The amplification fluid path includes a variable amplification orifice having its minimum flow area when the valve means is in the neutral position, and an increasing flow area as the valve means is displaced from the neutral position toward the first operating position. The variable amplification orifice begins to open at substantially the same time as the second and third variable flow control orifices begin to open.

DESCRIPTION OF THE PREFERRED EMBODIMENT

Figure 1:
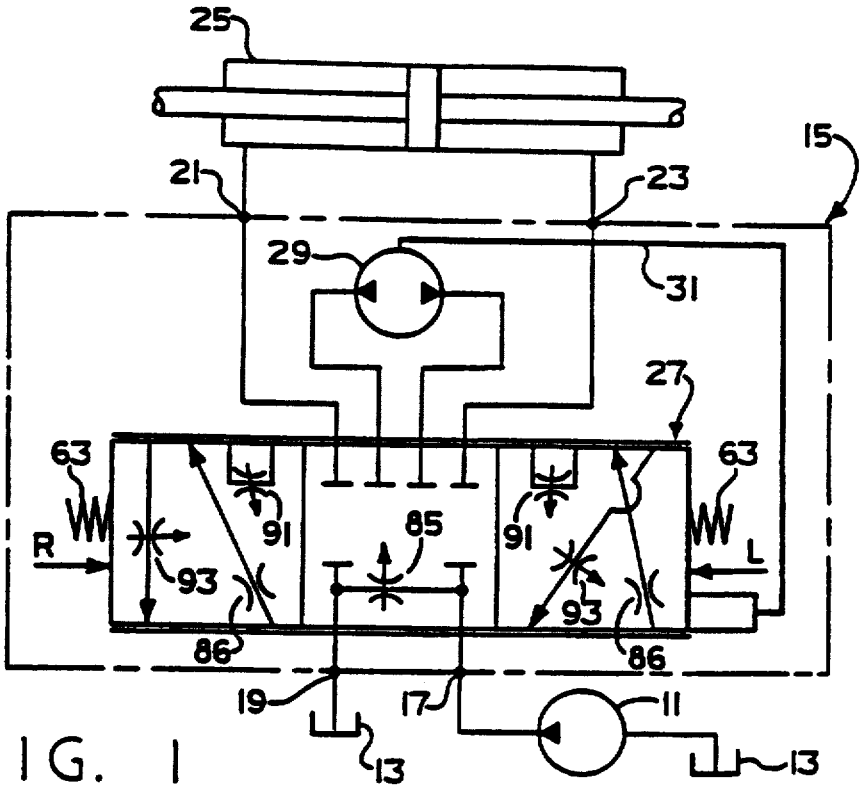
FIG. 1 is a hydraulic schematic of an open-center, hydrostatic power steering system of the type with which the present invention may be utilized.

Referring now to the drawings, which are not intended to limit the invention, FIG. 1 is a hydraulic schematic of a vehicle hydrostatic steering system including a fluid controller made in accordance with the teachings of the present invention. The system includes a fluid pump 11, shown herein as a fixed displacement pump, having its inlet connected to a system reservoir 13. The output of the pump 11 is directed to the hydrostatic steering system, and more specifically, to a fluid controller 15.

Referring still to FIG. 1, the fluid controller 15 includes an inlet port 17, a return port 19, and a pair of control (cylinder) fluid ports 21 and 23, which are connected to the opposite ends of a steering cylinder 25.

The fluid controller 15, which will be described in greater detail in conjunction with FIG. 2, may be of the general type illustrated and described in U.S. Pat. No. Re. 25,126, assigned to the assignee of the present invention and incorporated herein by reference. More specifically, the controller 15 is of the open-center type. Disposed within the controller 15 is a valving arrangement, generally designated 27, which is movable from its neutral position shown in FIG. 1 to either a right turn position R or a left turn position L. When the valving arrangement 27 is in either of the turn positions, the pressurized fluid flowing through the valving 27 also flows through a fluid meter 29, one function of which is to measure (meter) the proper amount of fluid to be communicated to the appropriate control port 21 or 23. As is well known to those skilled in the art, the other function of the fluid meter 29 is to provide follow-up movement to the valving 27, such that the valving 27 is returned to its neutral position after the desired amount of fluid has been communicated to the steering cylinder 25. In FIG. 1, this follow-up movement is achieved by means of a mechanical follow-up connection, indicated schematically at 31.

As is shown schematically in FIG. 1, the valving 27 defines a plurality of variable orifices whenever the valving is moved from its neutral position to one of its operating positions, either a right turn position R or a left turn position L. These variable orifices will be described in greater detail subsequently in conjunction with the detailed description of FIGS. 3 and 4.

Fluid Controller 15

Figure 2:
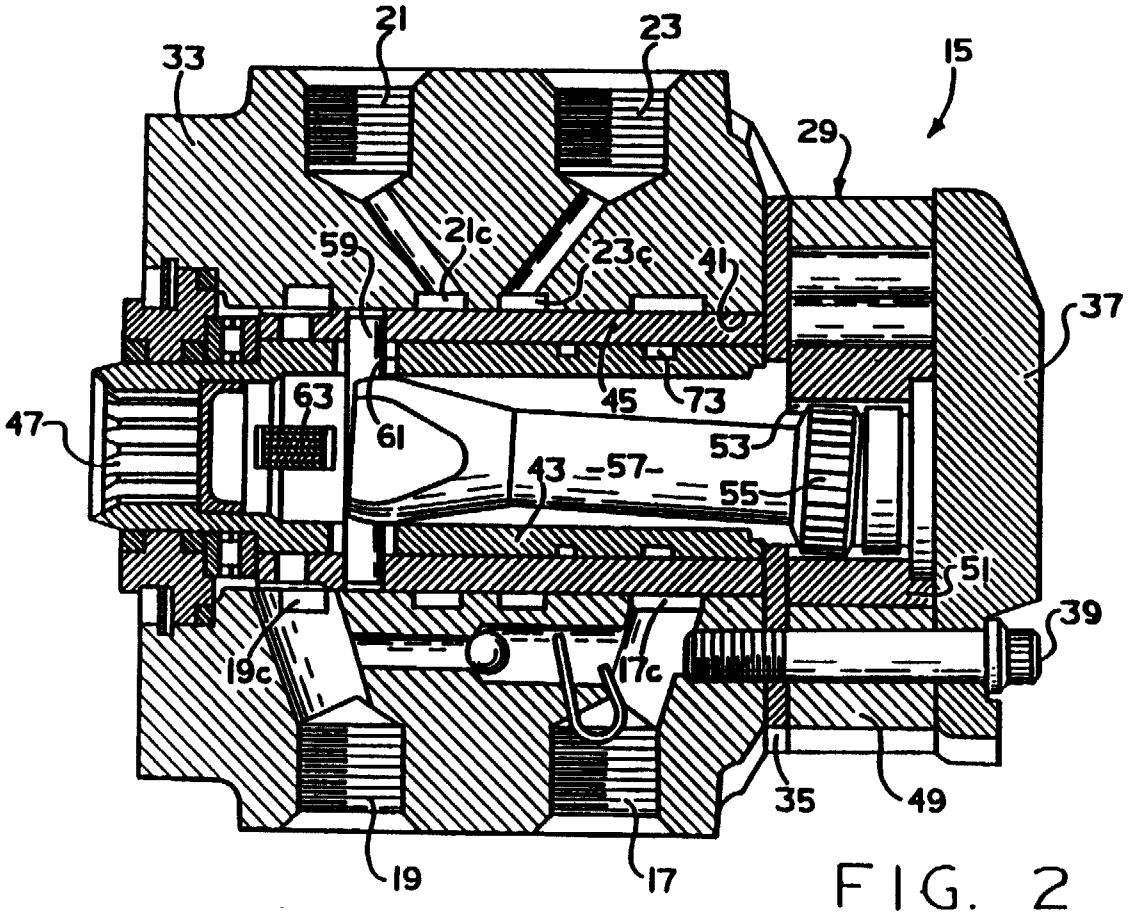
FIG. 2 is an axial cross-section of a fluid controller of the type to which the present invention relates.

Referring now to FIG. 2, the construction of the fluid controller will be described in some detail. The controller 15 comprise several sections, including a housing section 33, a port plate 35, a section comprising the fluid meter 29, and an end plate 37. These sections are held together in tight, sealing engagement by means of a plurality of bolts 39, which are in threaded engagement with the housing section 33. The housing section 33 defines the inlet port 17, the return port 19, and the control ports 21 and 23.

Rotatably disposed within a valve bore 41 defined by the housing section 33 is the valving arrangement 27, shown schematically in FIG. 1. The valving 27 comprises a primary, rotatable valve member 43 (hereinafter referred to as the "spool"), and a cooperating, relatively rotatable follow-up valve member 45 (hereinafter referred to as the "sleeve"). At the forward end of the spool 43 is a portion having a reduced diameter and defining a set of internal splines 47 which provide for a direct mechanical connection between the spool 43 and a steering wheel (not shown). The spool 43 and sleeve 45 will be described in greater detail subsequently.

The fluid meter 29 may be of the type well known in the art, and includes an internally-toothed ring 49, and an externally-toothed star 51. The star 51 defines a set of internal splines 53, and in splined engagement therewith is a set of external splines 55, formed at the rearward end of a drive shaft 57. The drive shaft 57 has a bifurcated forward end permitting driving connection between the shaft 57 and the sleeve 45, by means of a pin 59 passing through a pair of pin openings 61 in the spool 43. Thus, pressurized fluid flowing through the valving 27, in response to rotation of the spool 43, flows through the fluid meter 29, causing orbital and rotational movement of the star 51 within the ring 49. Such movement of the star 51 causes follow-up movement of the sleeve 45, by means of the drive shaft 57 and pin 59 (which comprise the follow-up connection 31 of FIG. 1), to maintain a particular relative displacement between the spool 43 and sleeve 45. As is well known to those skilled in the art, in an open-center controller, the relative displacement between the spool 43 and sleeve 45 is dependent upon the steering load, i.e., the hydraulic pressure being communicated to the steering cylinder 25. A plurality of leaf springs 63 extend through an opening in the spool 45, biasing the sleeve 45 toward the neutral position, relative to the spool 43.

It may be seen in FIG. 2 that the housing section 33 defines four annular chambers surrounding the spool 45, to provide fluid communication between the outer surface of the spool 45 and the various ports 17, 19, 21 and 23, the annular chambers being designated by the reference numeral of the respective port, accompanied by the letter "c".

The toothed interaction of the star 51, orbiting and rotating within the ring 49, defines a plurality of expanding and contracting fluid volume chambers, and adjacent each chambers, the port plate 35 defines a fluid port (not shown in FIG. 2). As is well known to those skilled in the art, the housing section 33 provides a plurality of axial bores (not shown in FIG. 2), each of which is in open communication at one end with one of the fluid ports and one of the volume chambers and, at its other end, with the valve bore 41.

Valuing Arrangement 27

Figure 4:
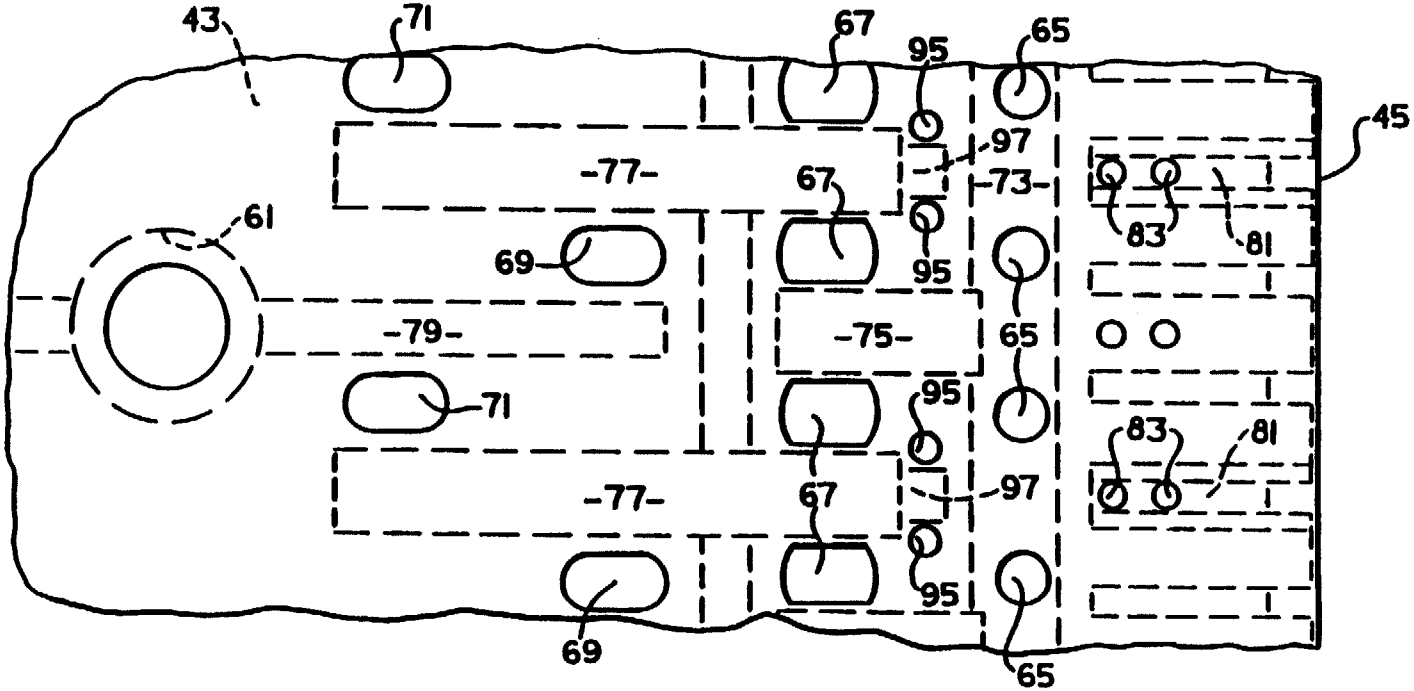
FIG. 4 is an overlay view of the valving used in the fluid controller shown in FIG. 2, but on a larger scale than in FIG. 2, and with the valving shown in the neutral position.

Referring now primarily to FIG. 4, the spool 43 and sleeve 45 will be described in greater detail. It should be noted that in FIG. 4, the spool 43 and sleeve 45 are shown in their proper relative rotational position to define therebetween the neutral condition illustrated schematically in FIG. 1. The sleeve 45 defines a plurality of pressure ports 65, in communication with the annular chamber 17c. To the left of the ports 65 is a plurality of meter ports 67, which communicate between the valving arrangement 27 and the expanding and contracting volume chambers of the fluid meter 29. Disposed to the left of the meter ports 67 is a plurality of cylinder ports 69, in communication with the annular chamber 23c, and further to the left, a plurality of cylinder ports 71, in communication with the annular chamber 21c.

The spool 43 defines an annular groove 73, and in communication therewith, a plurality of axial slots 75. Circumferentially, displaced from each of the axial slots 75 is a longer axial slot 77, and circumferentially aligned with each of the axial slots 75 is an even longer axial slot 79, the function of which will be described subsequently. To the right of the annular groove 73, the spool 43 defines a plurality of axial, open-center slots 81, each of which is in open communication, toward its right end, with the interior of the spool 43. To the right of the pressure ports 65, the sleeve 45 defines a plurality of pairs of open-center holes 83.

Operation of Valving

It is believed that the basic operation of the controller 15 and the valving 27 described thus far should be readily apparent in view of the teachings of the above-incorporated patent. However, the operation of the controller and valving will be described briefly, partly to relate the structure illustrated in FIGS. 2 and 4 to the schematics of FIGS. 1 and 3.

Referring still primarily to FIG. 4, when the valving is in the neutral position (no rotation of the steering wheel), inlet fluid is communicated from the inlet port 17 into the annular chamber 17c. Both the pressure ports 65 and the pairs of open-center holes 83 are in open communication with the annular chamber 17c, but flow through the pressure ports 65 and into the annular groove 73 does not occur, because the axial slots 75 are blocked from communication with the meter ports 67, in the neutral position shown in FIG. 4. Instead, inlet fluid flows from the annular chamber 17c through the open-center holes 83 and into the respective open-center slot 81. Each of the slots 81 is in open communication with the interior of the spool, as mentioned previously, and the interior of the spool is in open, relatively unrestricted fluid communication with the system reservoir 13 by means of the annular chamber 19c and return port 19. Therefore, in an open-center controller, with the valving in the neutral position shown in FIG. 4, the inlet fluid is not pressurized, i.e., the pressure of the inlet fluid is only slightly greater than the pressure in the system reservoir 13.

Figure 3:
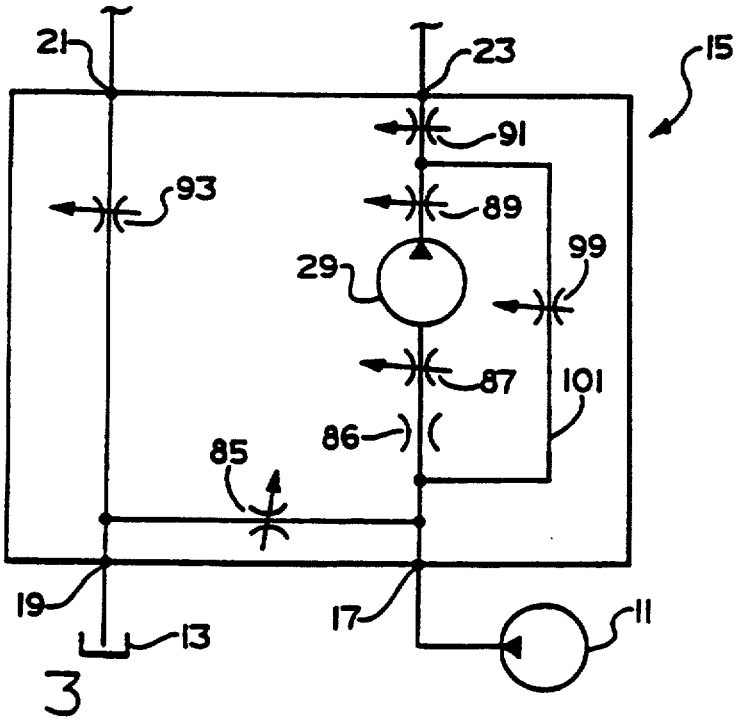
FIG. 3 is a unidirectional flow diagram illustrating the fluid controller shown schematically in FIG. 1, as well as the various orifices shown in FIG. 1, and including the teachings of the present invention.

The communication between each pair of open-center holes 83, and the respective open-center slot 81 defines a variable orifice, having its maximum flow area when the valving is in neutral, the composite of these individual orifices comprising a variable neutral flow control orifice 85 (see FIGS. 1 and 3).

Figure 5:
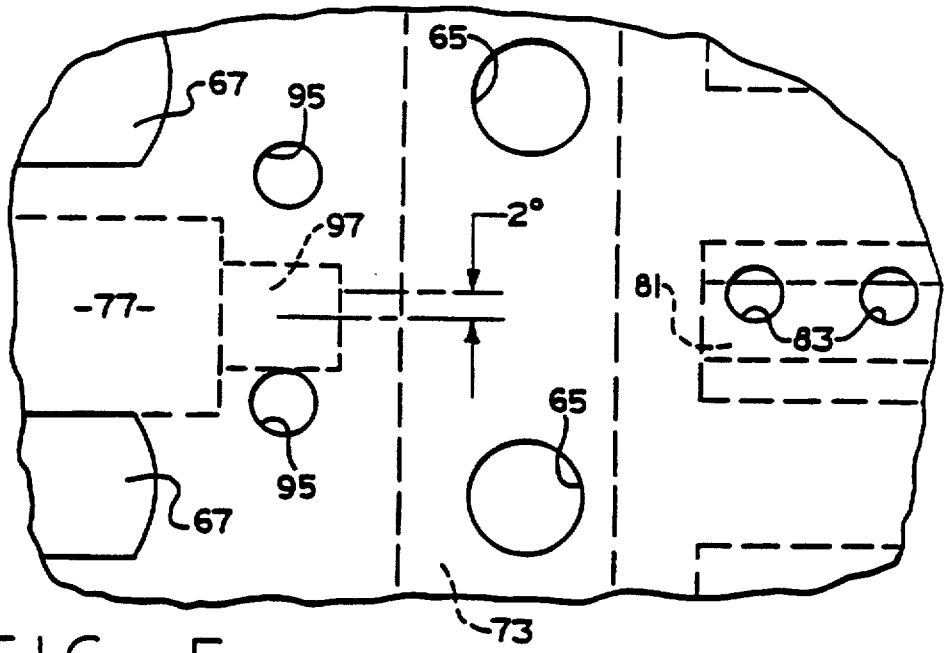
FIGS. 5–7 are enlarged, fragmentary overlay views, similar to FIG. 4, but with the valving displaced from the neutral position.

Referring now to FIG. 4, in conjunction with FIG. 5, when the spool 43 is displaced from the neutral position, relative to the sleeve 45, every other meter port 67 begins to communicate with the adjacent axial slot 75, such that inlet fluid now begins to flow through the pressure ports 65 into the annular groove 73; then through the axial slots 75 and into these meter ports 67. Each pressure port 65 defines a fixed orifice, the composite of these individual orifices comprising a fixed flow control orifice 86 (see FIGS. 1 and 2). The inlet fluid flows from these meter ports 67 to the expanding volume chambers of the meter 29. At the same time, fluid flows from the contracting volume chambers of the meter 29 back to the remaining, alternate meter ports 67, which are just beginning to communicate with the axial slots 77.

The communication between each of the axial slots 75 and every other meter port 67 define a variable orifice, the composite of these individual variable orifices comprising a variable flow control orifice 87 (see FIG. 3). At the same time, the communication between the alternate meter ports 67 and the axial slots 77 defines a variable orifice, the composite of these individual variable orifices comprising a variable flow control orifice 89. The variable orifice 87 is also frequently referred to as the A2 orifice, while the variable orifice 89 is frequently referred to as the A3 orifice.

As may be seen in FIG. 5 (wherein the spool has been rotated about two degrees relative to the sleeve), as the variable orifices 87 and 89 are beginning to open, the flow area of the neutral flow control orifice 85 is beginning to decrease, such that the pressure of the inlet fluid begins to increase.

After slightly more relative rotation between the spool 43 and sleeve 45, each axial slot 77 begins to communicate with its respective cylinder port 69, the communication therebetween defining a variable orifice. The composite of these individual variable orifices comprises a variable flow control orifice 91 (see FIGS. 1 and 3). The flow control orifice 91 is also frequently referred to as the A4 orifice. At the same time, each of the axial slots 79 begins to communicate with its respective cylinder port 71, the communication therebetween defining a variable orifice. The composite of these individual variable orifices comprises a variable flow control orifice 93 (see FIGS. 1 and 3). The flow control orifice 93 is also frequently referred to as the A5 orifice. Except as noted specifically hereinafter, the exact "phase relationship" among the various flow control orifices 87, 89, 91 and 93 is not an essential feature of the present invention, and will not be described in further detail. It is also not an essential feature of the present invention that the controller 15 have the particular arrangement of flow control orifices described hereinabove. For example, it is known in one controller produced commercially by the assignee of the present invention to have valving which does not require either an A2 orifice or an A3 orifice but does require a variable A1 orifice.

It should be noted that all of the structure and function described up to this point is generally well known in connection with open-center controllers of the type sold commercially by the assignee of the present invention. The additional structure provided by the present invention will now be described.

Amplification Fluid Path

Referring still primarily to FIGS. 4 and 5, the sleeve 45 defines a plurality of pairs of amplification bores 95. With the valving in the neutral position shown in FIG. 4, the bores 95 in each pair are centered with respect to an extension 97, which is in communication with the right end of the axial slot 77 in FIG. 4. As the spool 43 is displaced relative to the sleeve 45, one of each of the pairs of amplification bores 95 begins to communicate with the extension 97, and therefore, with the axial slot 77. The communication between each amplification bore 95, and its respective extension 97 defines a variable orifice, the composite of these individual orifices comprising a variable amplification orifice 99 (see FIG. 3). In the subject embodiment, the variable amplification orifice 99 begins to open at substantially the same time as the variable flow control orifices 87 and 89, for reasons which will be apparent to those skilled in the art.

As the spool 43 is displaced, relative to the sleeve 45, to the position shown in FIG. 5, and then beyond, inlet fluid flows from the annular chamber 17c through one of each pair of amplification bores 95, then through the extension 97 and into the axial slot 77. The fluid path just described will be referred to hereinafter as an amplification fluid path 101 (see FIG. 3), which includes the variable amplification orifice 99. As may best be seen in FIG. 3, the amplification fluid path 101 is in communication with the main fluid path at a location upstream of the fixed orifice 86. The fluid flowing through the amplification fluid path 101 then recombines with the main fluid path at a location downstream of the variable flow control orifice 89, but upstream of the variable flow control orifice 91. It will be understood by those skilled in the art that, when utilizing the present invention, it is necessary to increase the flow capacity of variable flow control orifices 91 and 93 to accommodate the total flow through both the main fluid path and the amplification fluid path.

Figure 6:
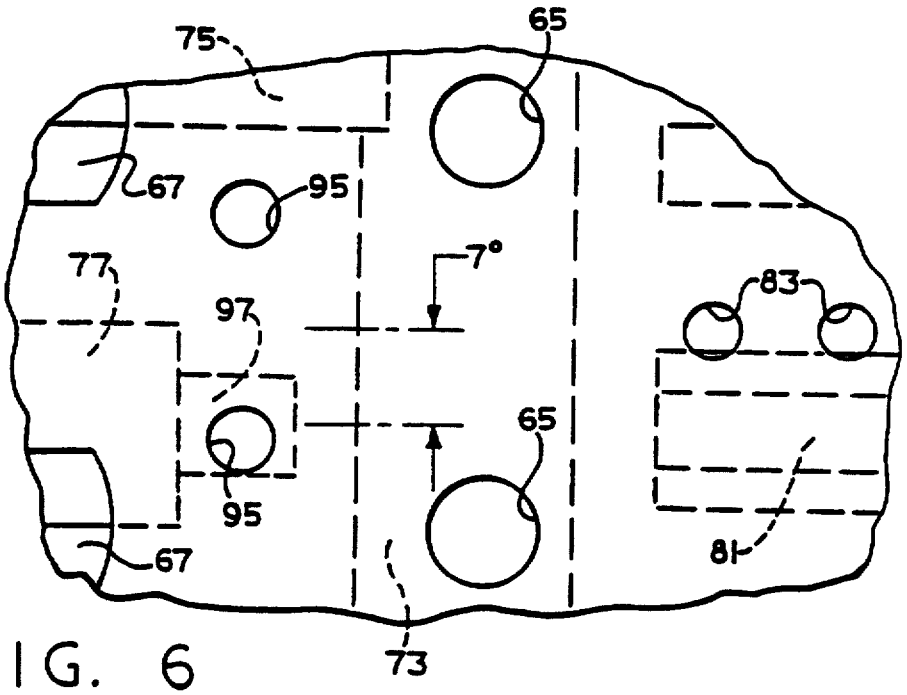

Referring now primarily to FIG. 6, the spool 43 has been displaced, relative to the sleeve 45, by about 7 degrees which, in the subject embodiment, would constitute a normal "operating position". At the displacement shown in FIG. 6, one of each pair of the amplification bores 95 is in complete communication with the extension 97, such that the variable amplification orifice 99 has now reached its maximum flow area. At the same time, the communication between the open-center holes 83 and the open-center slots 81 is greatly reduced, such that the neutral flow control orifice 85 is approaching its minimum flow area, which typically would be a zero flow, or closed position. Referring now to the graph of FIG. 8, it may be seen that the flow through the amplification fluid path 101 has reached its peak at the position shown in FIG. 6, although the flow through the amplification path 101 increases at a decreasing rate as the displacement approaches 7 degrees, whereas the flow through the main fluid path, designated "87", continues to increase almost linearly. It should be understood that the flow curve labeled "87" represents the rate of flow through the series combination of the flow control orifice 87, the fluid meter 29, and the flow control orifice 89.

Figure 7:
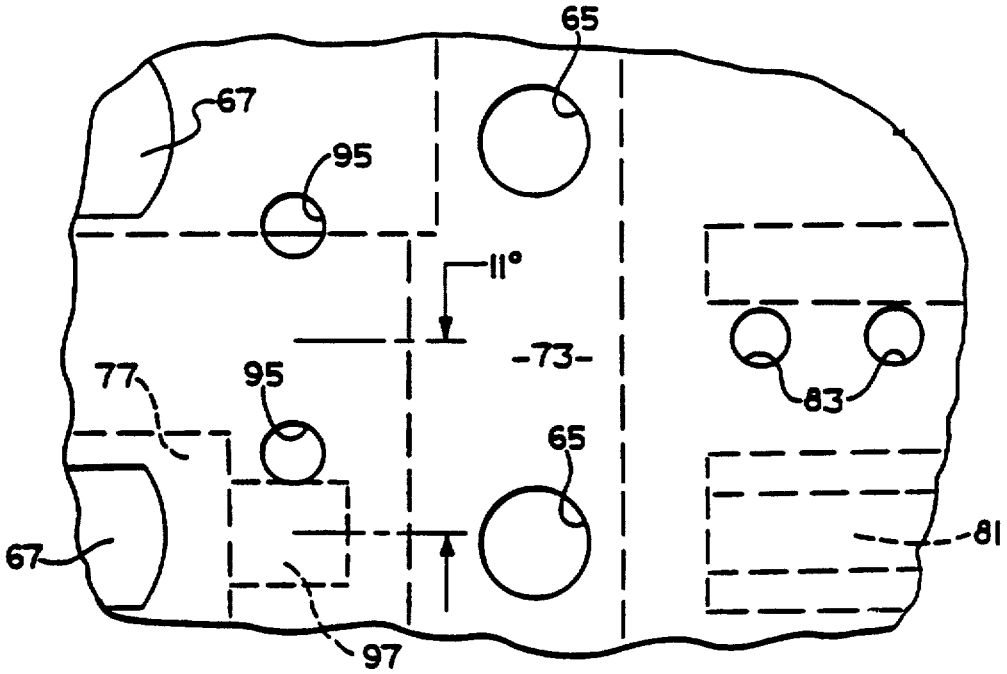
Figure 8:
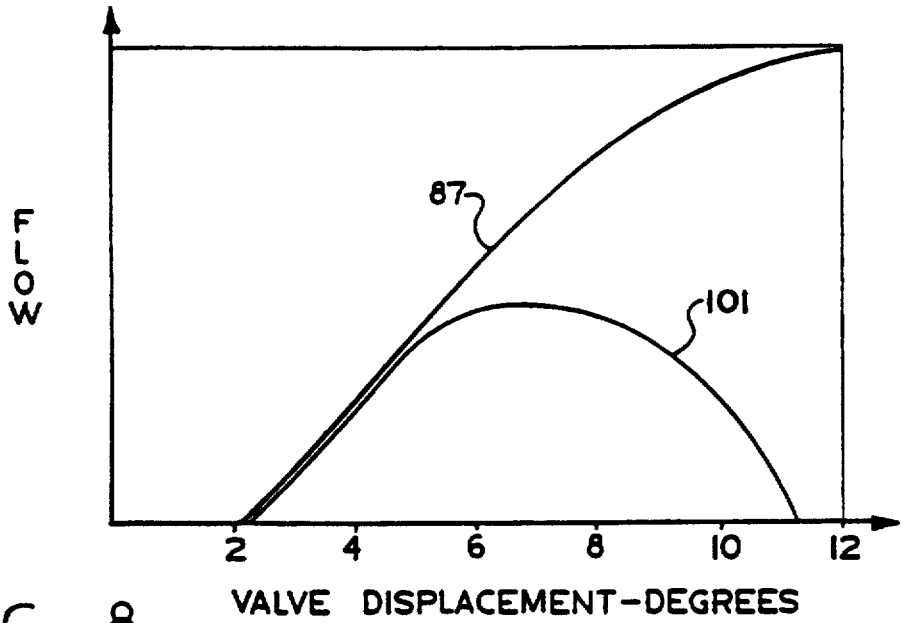
FIG. 8 is a graph of flow versus valve displacement, showing the main fluid path and the amplification fluid path of the present invention.

Referring now to FIG. 7, as the displacement of the spool 43, relative to the sleeve 45 increases from the 7 degrees shown in FIG. 6 to the 11 degrees shown in FIG. 7, the communication between each amplification bore 95 and the extension 97 actually decreases, such that the variable amplification orifice 99 begins to decrease, as does the flow through the amplification fluid path 101, as may be seen in FIG. 8. It should also be noted that the neutral flow control orifice 85, which was still open at the 7-degree displacement shown in FIG. 6, has already closed (at about 8 degrees displacement), so that the leak path to the reservoir represented by the neutral flow control orifice 85 is completely closed before the variable amplification orifice 99 closes completely. In the subject embodiment, with the amplification orifice 99 closing at approximately 11 degrees, as shown in FIG. 7, the maximum displacement possible between the spool 43 and sleeve 45 is approximately 12 degrees.

The reason for closing the variable amplification orifice 99 before the spool and sleeve reach maximum displacement is to permit operation of the controller 15 in the manual steering mode. As is well known to those skilled in the art, when the controller is operating in the manual steering mode, manual rotation of the steering wheel rotates the star 51 of the fluid meter 29, causing the meter to function as a hand pump, and generate pressurized fluid to actuate the steering cylinder. By closing the variable amplification orifice 99 prior to maximum displacement of the spool and sleeve, the amplification fluid path is not able to serve as a "short-circuit", which would make it practically impossible to generate sufficient pressure to steer the vehicle. See co-pending application U.S. Ser. No. 254,067, filed Oct, 6, 1988, in the name of Donald M. Haarstad, for a "STEERING CONTROL UNIT WITH BOTH FLOW AMPLIFICATION AND MANUAL STEERING CAPABILITY"

Referring again to the graph of FIG. 8, in the subject embodiment, the flow through the main flow path, designated "87" is nearly the same as the flow through the amplification fluid path 101, until approximately 5 or 6 degrees of displacement between the spool 43 and sleeve 45. The above is true only if the flow restriction through the amplification fluid path 101 is substantially identical to the flow restriction through the series combination of the variable orifice 87, the fluid meter 29, and the variable orifice 89. If those two flow restrictions are equal, the result is an amplification ratio of 2:1, i.e., the total flow out of the control fluid port (21 or 23) is twice the flow through the nu& fluid path. It is also possible, and would be within the ability of those skilled in the art, to vary the relationship between the flow restrictions of the amplification fluid path and main fluid path to provide an amplification ratio other than 2:1.

The foregoing specification has described the operation of the present invention as the controller valving is displaced from neutral to a first operating position (right turn in FIG. 1). It should be apparent to those skilled in the art that the foregoing description is equally applicable with regard to operation of the controller valving from the neutral position to a second operating position (left turn in FIG. 1), in which case the spool 43 is displaced in the opposite direction relative to the sleeve 45 ("upward" in FIGS. 5, 6 and 7). In that case, amplification flow would be through the other of each pair of amplification bores 95. In addition, communication of amplification flow and of metered fluid through the axial slots 77 would flow to the cylinder port 71 (rather than the cylinder port 69), thus flowing eventually to the, control fluid port 21.

The invention has been described in great detail in the foregoing specification, sufficient to enable one skilled in the art to practice the same, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. An open-center controller operable to control the flow of fluid from a source of fluid to a fluid pressure operated device; said controller being of the type including housing means defining a fluid inlet port for connection to the source of fluid, a returna port for connection to a reservoir, and first and second control fluid ports for connection to the fluid pressure operated device; valve means disposed in said housing means and defining a neutral position and a first operating position; said housing means and said valve means cooperating to define a neutral fluid path communicating between said inlet port and said return port, and including a variable neutral orifice having its maximum flow area when said valve means is in said neutral position, and a decreasing flow area as said valve means is displaced from said neutral position toward said first operating position; said housing means and said valve means cooperating to define a main fluid path communicating between said inlet port and said first control fluid port, and between said second control fluid port and said return port when said valve means is in said first operating position; fluid actuated means for imparting follow-up movement to said valve means proportional to the volume of fluid flow through said fluid actuated means, said fluid actuated means being disposed in series flow relationship in said main fluid path between said inlet port and said first control fluid port; said main fluid path including a first, [fixed] flow control orifice disposed between said inlet port and said fluid actuated means, a second, variable flow control orifice disposed between said first flow control orifice and said fluid actuated means, and a third, variable flow control orifice disposed between said fluid actuated means and said first control fluid port, said second and third flow control orifices having minimum flow areas when said valve means is in said neutral position, and increasing flow areas as said valve means is displaced from said neutral position toward said first operating position; characterized by:

(a) said housing means and said valve means cooperating to define an amplification fluid path in parallel with said main fluid path, said amplification fluid path being in fluid communication with said main fluid path at a first location disposed between said fluid inlet port and said first[, fixed] flow control orifice, and at a second location disposed between said third, variable flow control orifice and said first control fluid port;

(b) said amplification fluid path including a variable amplification orifice having its minimum flow area when said valve means is in said neutral position, and an increasing flow area as said valve means is displaced from said neutral position toward said first operating position; and (c) said variable amplification orifice begins to open at substantially the same time as said second and third, variable flow control orifices begin to open.

2. An open-center controller as claimed in claim 1 characterized by said valve means comprising a primary, rotatable valve member and a cooperating, relatively rotatable, follow-up valve member, said primary and follow-up valve members defining said neutral position relative to each other.

3. An open-center controller as claimed in claim 2 characterized by said primary and follow-up valve members cooperating to define said first, second, and third flow control orifices, the flow areas of said second and third flow control orifices varying in response to relative rotation of said primary and follow-up valve members.

4. An open-center controller as claimed in claim 2 characterized by said amplification fluid path and said variable amplification orifice being wholly defined by said primary and follow-up valve members.

5. An open-center controller as claimed in claim 1 characterized by said main fluid path including a fourth, variable flow control orifice disposed between said third, variable flow control orifice and said first control fluid port.

6. An open-center controller as claimed in claim 5 characterized by said amplification fluid path being in fluid communication with said main fluid path at a second location disposed between said third and fourth variable flow control orifices.

7. An open-center controller as claimed in claim 2 characterized by said fluid actuated means comprises a fluid meter including a metering member movable to measure the volume of fluid flowing through said main fluid path, said controller further comprising means coupling said metering member to said follow-up member.

8. An open-center controller as claimed in claim 1 characterized by said controller having a generally constant amplification ratio as said valve means is displaced from said neutral position to said first operating position, and a decreasing amplification ratio as said valve means moves from said first operating position toward a maximum displacement.

9. An open-center controller as claimed in claim 1 characterized by said variable amplification orifice having its maximum flow area when said valve means is in said first operating position, and a decreasing flow area as said valve means is displaced from said first operating position toward a maximum displacement position.

10. An open-center controller as claimed in claim 1 characterized by said housing means and said valve means cooperating to define a second main fluid path communicating between said inlet port and said second control fluid port, and between said first control fluid port and said return port when said valve means is in a second operating position.

11. An open-center controller as claimed in claim 10 characterized by said housing means and said valve means cooperating to define a second amplification fluid path in parallel with said second main fluid path, said amplification fluid path being in fluid communication with said second main fluid path at a first location disposed between said fluid inlet port and said first, [fixed] flow control orifice, and at a second location disposed between a third, variable flow control orifice and said second control fluid port.

12. An open-center controller as claimed in claim 11 characterized by said second amplification fluid path including a second variable amplification orifice having its minimum flow area when said valve means is in said neutral position, and an increasing flow area as said valve means is displaced from said neutral position toward said second operating position, said second variable amplification orifice begins to open at substantially the same time as said third, variable flow control orifice begins to open.

13. An open-center controller operable to control the flow of fluid from a source of fluid to a fluid pressure operated device; said controller being of the type including housing means defining a fluid inlet port for connection to the source of fluid, a return port for connection to a reservoir, and first and second control fluid ports for connection to the fluid pressure operated device; valve means disposed in said housing means and defining a neutral position and a first operating position; said housing means and said valve means cooperating to define a neutral fluid path communicating between said inlet port and said return port, and including a variable neutral orifice having its maximum flow area when said valve means is in said neutral position, and a decreasing flow area as said valve means is displaced from said neutral position toward said first operating position; said housing means and said valve means cooperating to define a main fluid path communicating between said inlet port and said first control fluid port, and between said second control fluid port and said retuen port when said valve means is in said first operating position; fluid actuated means for imparting follow-up movement to said valve means proportional to the volume of fluid flow through said fluid actuated means, said fluid actuated means being disposed in series flow relationship in said main fluid path between said inlet port and said first control fluid port; said main fluid path including a first, [fixed] flow control orifice disposed between said inlet port and said fluid actuated means, and a variable flow control orifice disposed between said fluid actuated means and said first control flow port, said variable flow control orifice having its minimum flow area when said valve means is in said neutral position, [at] *and* an increasing flow area as said valve means is displaced from said neutral position toward said first operating position; characterized by:

(a) said housing means and said valve means cooperating to define an amplification fluid path in parallel with said main fluid path, said amplification fluid path being in fluid communication with said main fluid path at a first location disposed between said fluid inlet port and said first[, fixed] flow control orifice, and at a second location disposed upstream of said variable flow control orifice;

(b) said amplification fluid path including a variable amplification orifice having its minimum flow area when said valve means is in said neutral position and an increasing flow area as said valve means is displaced from said neutral position toward said first operating position; and (c) said variable amplification orifice begins to open before said variable flow control orifice begins to open, said variable amplification orifice having its maximum flow area when said valve means is in said first operating position, and a decreasing flow area as said valve means is displaced from said first operating position toward a maximum displacement position, said variable amplification orifice being closed before said valve means reaches said maximum displacement position.

14. An open-center controller as claimed in claim 13 characterized by said valve means comprising a primary, rotatable valve member and a cooperating, relatively rotatable, follow-up valve member, said primary and follow-up valve members defining said neutral position relative to each other.

15. An open-center controller as claimed in claim 14 characterized by said primary and follow-up valve members cooperating to define said variable, neutral orifice, said first[, fixed] flow control orifice, and said variable flow control orifice, the flow areas of said variable orifices varying in response to relative rotation of said primary and follow-up valve members.

16. An open-center controller as claimed in claim 14 characterized by said amplification fluid path and said variable amplification orifice being wholly defined by said primary and follow-up valve members.

*17. An open-center controller as claimed in claim 1, characterized by said first flow control orifice comprising a fixed flow control orifice.*

*18. An open-center controller as claimed in claim 13, characterized by said first flow control orifice comprising a fixed flow control orifice.*

* * * * *